United States Patent [19]
Vining, Jr.

[11] 3,806,267
[45] Apr. 23, 1974

[54] COUPLING APPARATUS
[75] Inventor: L. Heath Vining, Jr., Alexandria, Va.
[73] Assignee: E-Systems, Inc., Greenville, Tex.
[22] Filed: Nov. 13, 1972
[21] Appl. No.: 306,140

[52] U.S. Cl............ 403/362, 403/379, 279/30
[51] Int. Cl....... F16d 1/06, B23b 5/22, B60b 27/06
[58] Field of Search............ 287/52.05, 52.08, 53 H, 287/53 TK; 279/30; 403/243, 316, 354, 319, 146, 255, 362, 379

[56] References Cited
UNITED STATES PATENTS
1,723,824  8/1929  Tobeler ........................ 273/53 TK
2,807,485  9/1957  Seibert ......................... 287/52.05
1,408,993  3/1922  Eberhardt ..................... 287/52.08

Primary Examiner—Jordan Franklin
Assistant Examiner—Conrad L. Berman
Attorney, Agent, or Firm—Richards, Harris & Medlock

[57] ABSTRACT

Disclosed is coupling apparatus for fixedly attaching a first body to a second body, for instance, a control knob or a gear to a shaft, where it is necessary or desirable to have access to the apparatus from an exposed frontal surface of the first body.

7 Claims, 6 Drawing Figures

PRIOR ART

PATENTED APR 23 1974   3,806,267

COUPLING APPARATUS

This invention relates to coupling apparatus and more particularly, the apparatus for coupling objects to a shaft or the like.

Set-screw arrangements of the type shown generally in FIGS. 1 and 2 have been known and used by engineers and designers for many years. Typically, a gear, knob or other body 10 having a bore 13 along the longitudinal axis thereof is mated with a portion, such as shaft 11, of a second body (not shown); the shaft 11 mates in close-fitting arrangement with the bore 13. A second bore 14 having a longitudinal axis perpendicular to the bore 13 is cut into the body 10 and is threaded. In the usual configuration, the bore 13 communicates with the surface of the gear at the periphery thereof, either at or near the gear teeth or at a reduced diameter portion of the body, adjacent the gear. A set-screw 12 is inserted into the threaded bore 13 and tightened until it contacts shaft 11 and forces the shaft into contact with the wall of bore 13 to create sufficient friction to prevent the removal of the gear 10 from the shaft without first loosening the set-screw 12.

In many cases this standard arrangement is perfectly satisfactory. It often occurs, however, that set-screw 12 is virtually inaccessible in a completed assembly because of its proximity to panels or the like located behind, over or near the gear. Typical set-screws, such as 12, are often small and must be approached directly from above, as with a standard screwdriver or hex wrench, and often there is not enough room to turn such devices to adjust the set-screw to facilitate attachment or removal of the knob. Where such access is not available, the simplicity of the standard arrangement is effectively lost.

Therefore, it is an object of this invention to provide an improved coupling apparatus.

It is another object of this invention to provide coupling apparatus having improved accessibility.

Still another object is to provide coupling apparatus which can be employed from an exposed frontal surface of the body.

A more complete understanding of the invention and its advantages will be apparent from the specification and claims and from the accompanying drawings illustrative of the invention.

Referring to the drawing.

Figure 1:
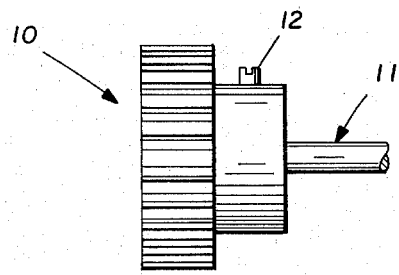
FIG. 1 shows a side view of a gear illustrating the coupling arrangement of the prior art.
Figure 2:
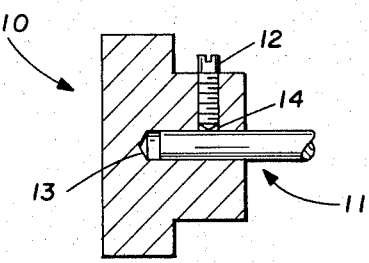
FIG. 2 is a sectional view of the gear and coupling arrangement of FIG. 1.
Figure 3:
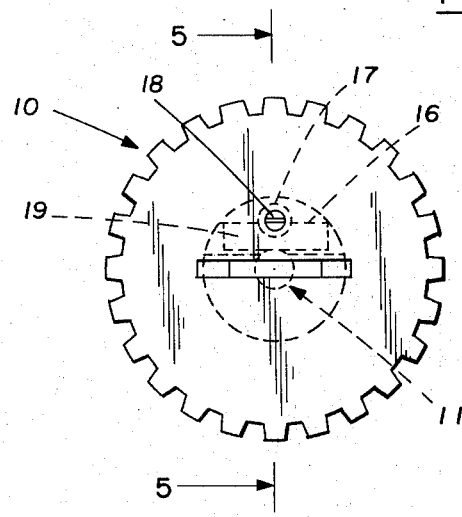
FIG. 3 is a frontal view of a gear and connecting arrangement illustrating the present invention.
Figure 5:
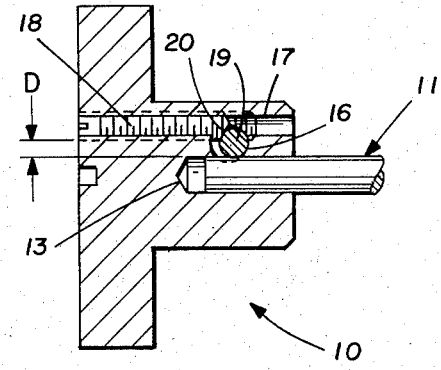
FIG. 5 is a partially sectioned side view of the gear of FIG. 3.
Figure 4:
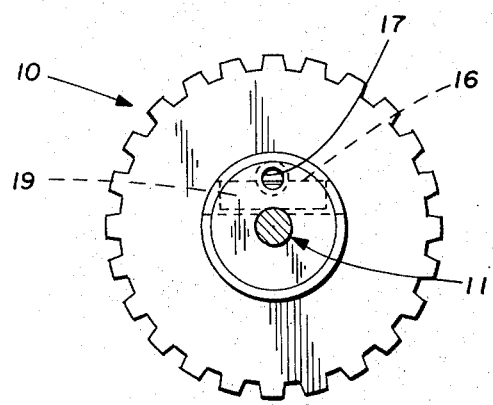
FIG. 4 is a rear view of the gear of FIG. 3.

Now consider FIGS. 3, 4, and 5. As with the previously described prior art devices, a bore 13 extends inwardly from a rear surface of the gear 10, but does not normally communicate with a front surface thereof.

A second bore 17 extends from an oppositely disposed front surface of the gear 10 inwardly thereof, but as with bore 13 does not necessarily extend completely through the body to communicate with the rear surface. In this case, the second bore 17 is parallel to and spaced from the bore 13 by a distance D to be defined. Additionally, in this embodiment, the longitudinal axis of each of the bores 13 and 17 lie in a common plane and are parallel therein, although it will be recognized that this exact configuration is not always required.

A third bore 16, perpendicular to the plane defined by the longitudinal axes of bores 13 and 17, is provided through the body of the gear 10. The diameter of bore 16 is larger than the spacing D between bores 13 and 17 and is positioned such that the bore 16 intersects both bores 13 and 17, respectively, by not more than 30–50 percent of their diameter. The amount of intersection is not critical within limits, but as will be described is related to the size of the holding pin 19.

The shaft 11 is of standard configuration having a circular cross-section and smooth exterior surface. Similarly, bore 13 has smooth walls, except for its intersection with bore 16, and shaft 11 and bore 13 mate in close-fitting relationship.

Bore 17 is provided with screw threads, and set-screw 18 mates therewith, having a threaded exterior surface. A first end 20 of the set-screw 18 is preferably conically shaped with the apex of the cone located on the central longitudinal axis of the screw. The second end of set-screw 18 is provided with a means for rotating the same, as with a screwdriver or hex wrench.

The holding pin 19 preferably is cylindrically shaped having a circular cross-section and smooth sides. It is cut to a length shorter than the length of the bore 16, but long enough such that when held in position, as described below, the pin will fully overlap bores 13 and 17 at all times that is, the length of the pin 19 is greater than the diameter of either bores 13 or 17.

The diameter of pin 19 is such that it exceeds the spacing D between the bores 13 and 17. Preferably, with shaft 11 positioned in bore 13 to a point beyond bore 16, the pin 19 will extend into bore 17 by approximately 30 percent of its diameter. The diameter of bore 16 is sized accordingly that is, the diameter of bore 16 is greater than the diameter of the pin 19.

Pin 19 is held in position in bore 16 in any convenient manner, such as staking the periphery of the bore at each end after the pin is inserted.

In operation, the shaft 11 is inserted fully into bore 13, and set-screw 18 is inserted in bore 17 by rotating the same in the usual manner. In this position, shaft 11 contacts pin 19 to extend the same outwardly into bore 17, and as set-screw 18 is tightened, the conically shaped surface of end 20 thereof contacts pin 19 forcing it downwardly into shaft 11. The frictional forces between set-screw 18, holding pin 19, and shaft 11 effectively lock the knob 10 to the shaft 11.

Figure 6:
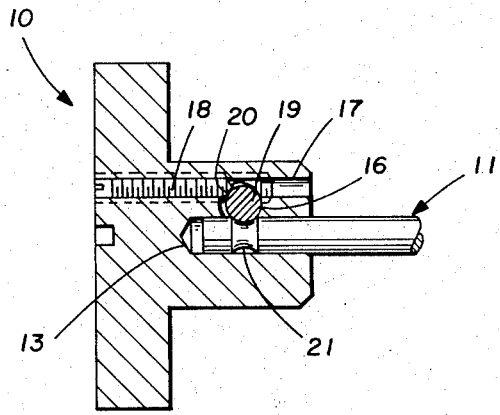
FIG. 6 is a sectional side view of still another embodiment of a gear and coupling arrangement illustrating this invention.

Refer to FIG. 6, where a more positive lock is desired, the shaft 11 is constructed to have an annular groove 21 spaced from the end thereof such that with the shaft fully inserted in bore 13, the groove 21 is in register with bore 16. In this configuration, as set-screw 18 forces pin 19 into groove 21, shearing forces would be required in addition to frictional forces to effect the removal of shaft 11, thus requiring a more positive lock.

While several embodiments of the invention, together with modifications thereof, have been described in detail herein and shown in the accompanying drawings, it will be evident that various further modifications are possible without departing from the scope of the invention.

What is claimed is:

1. Front-locking apparatus comprising:
   a first body having at least oppositely disposed front and rear surfaces, and having a first bore communicating with the rear surface, a second bore substantially perpendicular to the first bore and intersecting the first bore by not more than a portion of the diameter thereof, the second bore having a lengthwise dimension greater than the diameter of the first bore and a third bore communicating with the front surface of the body and intersecting the second bore by not more than a portion of the diameter thereof and positioned to be spaced from said first bore and at a point substantially opposite to the intersection of the first and second bores, said first and third bores extending into the body beyond their respective intersection with the second bore;
   a shaft positioned in said first bore in close-fitting relationship therewith and extending into the bore beyond the intersection of the second bore;
   locking means movably positioned in the second bore, having a length greater than the diameter of said first bore and a diameter greater than the spacing between the first and third bores and less than the diameter of the second bore; and
   means associated with the third bore and accessible from said front surface only for forcing the locking means into locking contact with the shaft.

2. The apparatus as set forth in claim 1 wherein the third bore is provided with screw threads and the means associated with said bore for forcing the pin into locking arrangement with the shaft is a set-screw adapted to mate with said threads.

3. The apparatus as set forth in claim 2 wherein the set-screw has a conically shaped end portion with the apex of said cone extending away from said set-screw and coinciding with the longitudinal axis thereof.

4. The apparatus as set forth in claim 1 wherein the locking means is a cylindrically shaped pin.

5. Coupling apparatus comprising:
   a body for mating to a shaft, having a first bore communicating with a first surface of the body and sized to accommodate the shaft in a close-fitting relationship, said body having a second bore substantially perpendicular to the first bore and intersecting the first bore by not more than a portion of the diameter thereof, the second bore having a lengthwise dimension greater than the diameter of the first bore and a third bore communicating with a second surface of the body and substantially perpendicular to the second bore and positioned to intersect said second bore opposite to and in spaced relationship with the intersection with said first bore, said third bore communicating with the second surface of said body disposed in an opposing relationship to said first surface thereof and including screw threads along the interior thereof;
   a set-screw positioned in the third bore in mated relationship with the screw threads thereof and accessible from said second surface only; and
   a pin positioned in the second bore in movable relationship with respect to the first and third bores, said pin having a length greater than the diameter of said first bore and a diameter greater than the spacing between the first bore and the third bore and less than the diameter of the second bore.

6. A front locking body comprising:
   a body for mating to a shaft, having a first bore communicating with a first surface of the body sized to accommodate the shaft in close-fitting relationship, said body having a second bore positioned to intersect the first bore and being substantially perpendicular thereto, the second bore having a lengthwise dimension greater than the diameter of the first bore and a third bore disposed to intersect substantially perpendicular with said second bore opposite to and in spaced relationship with the intersection of the second bore with said first bore, said third bore communicating with a second surface of the body disposed in an opposing relationship to said first surface thereof;
   locking means positioned in the second bore in movable relationship between the first and third bores, said means being at least a circular cross-section, the largest diameter of which is greater than the spacing between said first and third bores and less than the diameter of the second bore; and
   means associated with the third bore and accessible from said second surface only for activating the locking means.

7. The apparatus as set forth in claim 6 wherein the locking means is a cylindrically shaped pin.

* * * * *